(12) United States Patent  (10) Patent No.: US 8,384,775 B2
Yamazaki  (45) Date of Patent: Feb. 26, 2013

(54) SCANNING TYPE IMAGE DISPLAY DEVICE

(75) Inventor: Tetsuro Yamazaki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1602 days.

(21) Appl. No.: 11/889,044

(22) Filed: Aug. 8, 2007

(65) Prior Publication Data

US 2008/0049101 A1 Feb. 28, 2008

(30) Foreign Application Priority Data

Aug. 9, 2006 (JP) .................................. 2006-216930
Jul. 12, 2007 (JP) .................................. 2007-183509

(51) Int. Cl.
*H04N 9/11* (2006.01)
(52) U.S. Cl. .......................................... 348/97; 348/108
(58) Field of Classification Search .................... 348/97, 348/108
See application file for complete search history.

(56) References Cited

U.S. PATENT DOCUMENTS

| | | | | |
|---|---|---|---|---|
| 3,582,886 A * | 6/1971 | Hardin et al. | ................. | 382/317 |
| 3,804,978 A * | 4/1974 | Lemelson | ........................ | 348/97 |
| 4,184,177 A * | 1/1980 | Millward | ...................... | 348/100 |
| 4,288,818 A * | 9/1981 | Poetsch | ........................... | 348/97 |
| 4,574,279 A * | 3/1986 | Roberts | ........................... | 345/25 |
| 5,301,021 A * | 4/1994 | Ogino et al. | .................. | 348/564 |
| 5,430,478 A * | 7/1995 | Kaye et al. | ....................... | 348/99 |
| 5,528,288 A * | 6/1996 | Sandor et al. | .................. | 348/97 |
| 5,555,092 A * | 9/1996 | Kaye et al. | ..................... | 348/107 |
| 5,557,322 A * | 9/1996 | Millward | ....................... | 348/100 |
| 5,680,172 A * | 10/1997 | Walker | ............................ | 348/97 |
| 5,844,539 A * | 12/1998 | Kitagawa | ....................... | 345/100 |
| 5,883,668 A * | 3/1999 | Kazama et al. | ............... | 348/303 |
| 6,091,446 A * | 7/2000 | Walker | ............................ | 348/97 |
| 6,245,590 B1 * | 6/2001 | Wine et al. | ...................... | 438/52 |
| 7,692,836 B2 * | 4/2010 | Yamazaki | .................. | 359/202.1 |
| 7,859,567 B2 * | 12/2010 | He et al. | ......................... | 348/195 |
| 7,986,340 B2 * | 7/2011 | He et al. | ......................... | 348/195 |
| 7,990,598 B2 * | 8/2011 | Yamazaki | .................. | 359/202.1 |
| 2004/0004585 A1 | 1/2004 | Brown et al. | | |
| 2007/0291051 A1 | 12/2007 | Brown et al. | | |
| 2008/0049101 A1 * | 2/2008 | Yamazaki | ....................... | 348/97 |
| 2008/0144150 A1 | 6/2008 | Champion et al. | | |

FOREIGN PATENT DOCUMENTS

| | | |
|---|---|---|
| JP | A 01-245780 | 9/1989 |
| JP | A-2003-140078 | 5/2003 |
| JP | A-2005-526289 | 9/2005 |

* cited by examiner

*Primary Examiner* — Backhean Tiv
(74) *Attorney, Agent, or Firm* — Oliff & Berridge, PLC

(57) ABSTRACT

A scanning-type image display device includes: a light source section; a horizontal scanner; a vertical scanner; and a vertical scanner control section that controls the vertical scanner in such a manner that, when a second video signal is input, the vertical scanner control section controls the vertical scanner so as to perform vertical scanning with a scanning speed of vertical scanning which is higher than that of vertical scanning in the case of a first video signal being input, and after temporarily retuning a drawing position to an initial position within a time range from a point of time at which horizontal scanning of a current frame is completed to a start time of a next frame, the vertical scanner control section restarts the vertical scanning from the initial position in synchronization with a start timing of the next frame.

8 Claims, 4 Drawing Sheets

SCANNING TYPE IMAGE DISPLAY DEVICE

CROSS-REFERENCE TO RELATED APPLICATION

This application claims priority from Japanese Patent Application No. 2006-216930, filed on Aug. 9, 2006, and Japanese Patent Application No. 2007-183509, filed on Jul. 12, 2007, the contents of which are incorporated herein by reference.

BACKGROUND

1. Technical Field

The pen invention relates to a scanning-type image display device.

2. Related Art

In recent years, a scanning-type image display device has been proposed that displays images by raster scanning a beam of light such as laser light on a projection surface.

Since this device can achieve a perfect black by stopping the supply of laser light, a higher contrast display is possible compared to a projector or the like that uses a liquid crystal light valve, for example.

Moreover, since an image display device that employs laser light is characterized by having a high color purity due to the laser light being a single wavelength and by readily shaping (focusing) the beam due to high coherence, it is expected to be used as a high-definition display that realizes high resolution and high color reproduction.

Also, in contrast to liquid crystal displays and plasma displays or the like, since the scanning-type image display device does not have fixed pixels, there is no concept of pixel number and so has the advantage of easily changing the resolution.

In order to generate an image with the scanning-type image display device, it is necessary to scan light in two dimensions using scanners such as a polygon mirror or a galvano-mirror.

Although there is a method of scanning light in two dimensions while moving a single scanner in the two directions of a horizontal direction and a vertical direction, in this case, there is a problem in that the constitution and control of the scanning system becomes complicated.

Therefore, there has been proposed a scanning-type image display device provided with two sets of scanners each scanning light in one dimension so as to incorporate horizontal scanning and vertical scanning, respectively.

Conventionally, it is normal to use a polygon mirror or a galvano-mirror for a scanner of the both directions. A projection device that employs a polygon mirror in scanner of the both directions is disclosed in Japanese Unexamined Patent Application No. H01-245780.

Although a device that uses a polygon mirror is introduced in Japanese Unexamined Patent Application No. H01-245780, increasing the resolution of an image format entails higher scanning frequencies, which approaches the limits of a polygon mirror or a galvano-mirror.

Therefore, in recent years systems have been announced that utilize Micro Electro Mechanical Systems (MEMS) technology in high-speed scanners.

A scanner that utilizes MEMS technology (hereinafter simply referred to as a "MEMS scanner") is one manufactured utilizing micro-processing technology of a semiconductor material, such as silicon, and drives a mirror supported by a torsion spring or the like with electrostatic force or the like.

This scanner can scan light by causing the mirror to travel in a reciprocating motion via the interaction of the electrostatic force and the restoring force of the spring.

By using a MEMS scanner, it is possible to achieve a scanner that can be operated at a high frequency and large deflection angle compared to a conventional scanner. Thereby, it is possible to display high-resolution images.

In order to realize scanning with a high speed MEMS scanner, since the mirror must be made to travel in a reciprocation manner at the resonance point, assuming a given resolution, it is necessary to design and fabricate the resonance point of the mirror so as to agree with that resolution.

On the other hand, in viewpoint from the video software, many video formats have in recent years come into wide use with different resolutions, scan modes (interlaced, progressive, etc.) and screen aspect ratios or the like. Consequently, there is a demand from users to watch different video formats on a single image display device.

However, as stated above, since MEMS scanners are manufactured to meet a specific resolution, when a video format having other than the intended resolution is input to the image display device, there are problems in that the image is reduced on the screen, and the entire image is not displayable, or the image distortion occurs because the horizontal scanning and vertical scanning cannot be synchronized.

While there are methods of performing resolution conversion by image processing so as to prevent such problems, in this case an enormous load on the image processing circuit.

Examples of problems in the case of using a MEMS minor were given above, but these problems are not limited to a device using a MEMS mirror, being common to devices that use other resonant-type scanners such as a resonant-type galvanomirror or the like.

SUMMARY

An advantage of some aspects of the invention is to provide a scanning-type image display device in which it is possible to display an image at an appropriate size in accordance with the size of the screen without performing resolution conversion and it is possible to ensure a favorable display quality by reliably synchronizing the horizontal scan and vertical scan.

A first aspect of the invention provides a scanning-type image display device including: a light source section that emits light; a horizontal scanner that scans the light in a horizontal direction and that is capable of scanning at a scan line number defined by a first video signal; a vertical scanner that scans the light in a vertical direction; and a vertical scanner control section that controls the vertical scanner in such a manner that, when a second video signal is input that has a scan line number that is less than the scan line number defined by the first video signal, the vertical scanner control section controls the vertical scanner so as to perform vertical scanning with a scanning speed of vertical scanning which is higher than the scanning speed of vertical scanning in the case of the first video signal being input, and after temporarily returning a drawing position of vertical scanning to an initial position within a time range from a point of tine at which horizontal scanning of a current frame is completed to a start time of a next frame, the vertical scanner control section restarts the vertical scanning from the initial position in synchronization with a start timing of the next frame.

Also, a second aspect of the invention provides a scanning-type image display device including: a light source section that emits light; a horizontal scanner that scans the light in a horizontal direction and that is capable of scanning at a scannable line number determined by a format of a first video signal; a vertical scanner that scans the light in a vertical direction; and a vertical scanner control section that controls the vertical scanner in such a manner that, when the scannable line number determined by the format of the first video signal is greater than a target scan line number at which the horizontal scanner is to scan as determined by a format of a second video signal, and when the second video signal is input, the vertical scanner control section controls the vertical scanner so as to perform vertical scanning with a scanning speed of vertical scanning which is higher than the scanning speed of vertical scanning at a time at which the first video signal is input, and after temporarily retuning a drawing position of vertical scanning to an initial position with in a time range from a point of time at which horizontal scanning of a current frame is completed to a start time of a next frame, the vertical scanner-control section restarts the vertical scanning from the initial position in synchronization with a start timing of the next frame.

The "phrase horizontal scanner" mentioned here is a scanner that among two directions of scanning, performs high-speed scanning, while the phrase "vertical scanner" is a scanner that performs low-speed scanning. The two do not necessarily correspond to the horizontal and vertical of an image.

For example, even when the horizontal side of an image format is the one being scanned at a high speed, in the case of constituting an actual device, it is conceivable for the pixel information from the image signal to be reconstituted so that the vertical aspect of an image becomes the one that is scanned at a high speed.

The phrase "scannable line number" equivalently means "scan line number defined by first video signal" of the above described scanning-type image display device of the first aspect of the invention. The phrase "target scan line number" equivalently means "second video signal has a scan line number that is less than the scan line number defined by the first video signal" of the above described scanning-type image display device of the first aspect of the invention.

As stated above, it is conceivable for video signals having various video formats being input to the scanning-type image display device.

In such a case, there are two kinds of signals, namely, a video signal being input with a resolution that is lower than the resolution at which the horizontal scanner is designed, and a video signal with a higher resolution.

Among these, the scanning-type image display device of the invention is applicable to the case of a video signal being input with a resolution that is lower than the resolution that the horizontal scanner is designed for.

That is, the above described case, stated in terms of the constituent features of the invention, refers to the case of the number of scan lines that a horizontal scanner, which is manufactured assuming a first video signal is input, is capable of scanning (scannable line number) being greater than the number of scan lines that the horizontal scanner is to scan as determined by the fort of a second video signal in the case of the second video signal being input (target scan line number).

Even if the scannable line number is greater than the target scan line number, the horizontal scanner is able to carry out its role as long as it is able to scan the target scan line number.

However, when driven as designed to attain a high performance, the horizontal scanner scans the scannable line number, which is greater than the target scan line number.

As a result, the drawing of one fame segment of the video signal actually ends up being completed in a time that is shorter than one frame period.

Here, since the vertical scanning is performed at a speed that corresponds to the assumed resolution, the image is displayed in a manner contracted in the vertical direction.

Therefore, when the second video signal is input, if vertical scanning is performed with the scanning speed of vertical scanning which is higher than the scanning speed of the vertical scanning at a time at which the first video signal is input, the image which is contracted in the vertical direction is displayed stretched, and it is possible to return to its normal display state.

However, once the horizontal scanning (drawing) of the target line number is completed, if the vertical scanner at this point returns to its initial position and immediately restarts vertical scanning, since the time actually required for the drawing of one frame segment of the video signal is shorter than one frame period, the vertical scanning does not agree with the image format, leading to image distortion.

Therefore, after reaming the drawing position of the vertical scanner to the initial position using the time range from a point of time at which the horizontal scanning of the current frame is completed to a start time of the next frame, if the vertical scanning is restated from the initial position in synchronization with the start timing of the next frame, the horizontal scanning and vertical scanning are reliably synchronized, and so no image distortion occurs.

From the above, the scanning-type image display device of the aspects of the invention can display an image with a high display quality without performing resolution conversion even in the event of a low-resolution video signal.

It is preferable that, in the scanning-type image display device of the second aspect of the invention, the vertical scanner control section control the vertical scanner so as to raise the scanning speed by the vertical scanner by a substantial multiple of reciprocal of a ratio of the target scan line number to the scannable line number.

For example, if the ratio of the target scan line number to the scannable line number is b/a (b<a), the image contracts in the vertical direction by b/a. However, according to the above described constitution, since the scanning speed is raised by the reciprocal, that is, a/b times, the image that is contracted by b/a is displayed stretched a/b times, and so a normal image can be displayed.

It is preferable that, in the scanning-type image display device of the second aspect of the invention, in a case of a ratio of the target scan line number to the scannable line number being equal to or less than 1/m where "m" is an integer of 2 or more, the vertical scanner control section control the vertical scanner so as to perform vertical scanning with the scanning speed raised, and, after temporarily returning the drawing position of the vertical scanning to the initial position, perform an operation of resetting the vertical scanning from the initial position m times in 1 cycle (1 frame).

Also, in the case of repeating the operation of restarting the vertical scanning from the initial position m times, a constitution may be adopted that, from the second instance onward, generates an intermediate frame image from the image of the current frame and the image of the next frame, and displays the intermediate frame image. This constitution can obtain a smooth image particularly when displaying a moving image.

For example, if m=2, that is, if the ratio of the target scan line number to the scannable line number is equal to or less than ½, drawing of one frame segment is completed in the time equal to or less than ½ of 1 frame period.

In this case, stated the other way around, since the time of at least half of 1 frame period becomes time during which the display is a completely black, flickering of the screen results, which causes a drop in display quality.

In such a situation, it is thus possible to perform twice in one cycle (1 frame) the operation of vertical scanning with increased scanning speed and, after temporarily retuning the drawing position to the initial position, restarting the vertical scanning from the initial position.

By doing so, the screen flickering is reduced, which can further improve the display quality.

It is preferable that, in the scanning-type image display device of the second aspect of the invention, the vertical scanner control section control the vertical scanner so as to calculate the time range that corresponds to the difference obtained by subtracting the target scan line number from the scannable line number, return the drawing position of the vertical scanning by the vertical scanner to the initial position and stop the vertical scanning during the time range from a point of time at which the horizontal scanning of the current frame is completed, and restart the vertical scanning after the time range from a point of time at which the horizontal scanning is completed has elapsed.

According to this constitution, since it is possible to control with just the time range that is calculated by the above described calculation of the restart timing of the vertical scanning by the vertical scanner, there is no need to monitor other control signals, and so the circuit constitution of the vertical scanner control section is simple.

It is preferable that, in the scanning-type image display device of the second aspect of the invention, the vertical scanner control section perform an operation of returning the drawing position of the vertical scanning by the vertical scanner to the initial position during the first half of the time range.

Since overshooting generally occurs in the case of performing the operation of returning a scanner to its initial position, there is a case in which it takes some time until it completely settles in a stable state in the initial position.

Accordingly, when performing the operation of returning the scanner to its initial position in the second half of the time range, in certain cases the time until the scanner stabilizes can drag into the initial period of the next frame, and so there is concern that image distortion occurs.

On this point, if the operation of returning the scanner to its initial position is performed in the first half of the time range, since the second half of the time range can be used as time until entering a stable state, the risk of image distortion can be eliminated.

Note that the operation of returning the scanner to the initial position is more preferably performed immediately after the completion of the horizontal scanning.

A third aspect of the invention provides a scanning-type image display device including: a light source section that emits light; a horizontal scanner that scans the light in a horizontal direction and that is capable of scanning at a scan line number defined by a first video signal; a vertical scanner that scans the light in a vertical direction; and a vertical scanner control section that controls the vertical scanner in such a manner that, when a second video signal is input that has a scan line number that is less than the scan line number defined by the first video signal, the vertical scanner control section controls the vertical scanner so as to raise the scanning amplitude of the vertical scanning by the vertical scanner to be greater than the scanning amplitude of the vertical scanning in the case of the first video signal being input.

A fourth aspect of the invention provides a scanning-type image display device including: a light source section that emits light; a horizontal scanner that scans the light in a horizontal direction and that is capable of scanning at a scannable line number determined by a format of a first video signal; a vertical scanner that scans the light in a vertical direction; and a vertical scanner control section that controls the vertical scanner in such a manner that, when the scannable line number determined by the format of the first video signal is greater than a target scan line number at which the horizontal scanner is to scan as determined by a format of a second video signal, and when the second video signal is input the vertical scanner control section controls the vertical scanner so as to increase the scanning amplitude of the vertical scanning by the vertical scanner to be greater than the scanning amplitude of vertical scanning at a time at which the first video signal is input.

The phrase "scannable line number" equivalently means "scan line number defined by first video signal" of the above described scanning-type image display devices of the invention. The phrase "target scan line number" equivalently means "second video signal has a scan line number that is less than the scan line number defined by the first video signal" of the above described scanning-type image display devices of the invention.

The scanning-type image display devices described above correct the contraction of an image in the vertical direction by increasing the scanning speed of the vertical scanning. In contrast, the scanning-type image display devices of the third and fourth aspects of the invention correct the contraction of an image by increasing the amplitude of the vertical scanning.

In the case of increasing the scanning amplitude, the distance over which the drawing position travels in the vertical direction per unit time increases, and in effect becomes equivalent to increasing the speed of the vertical scanning.

Accordingly, the third and fourth scanning-type image display devices of the invention can obtain the same effect as the scanning-type image display devices of the invention described above, namely, being capable of displaying an image with a high display quality without performing resolution conversion even in the event of a low-resolution video signal.

Also, in the case of this constitution, since only the scanning amplitude of the vertical scanning at a time at which the second video signal is input is made greater than the amplitude of vertical scanning at a time at which the first video signal is input, there is no need to temporarily stop the vertical scanning, unlike the scanning-type image display devices of the invention described above.

It is preferable that, in the scanning-type image display device of the fourth aspect of the invention, the vertical scanner control section control the vertical scanner so as to increase the scanning amplitude by the vertical scanner by a substantial multiple of reciprocal of a ratio of the target scan line number to the scannable line number.

In this constitution as well, since it is possible to stretch an image by just the amount it is contracted in the vertical direction by increasing the scanning amplitude by the substantial multiple of reciprocal of the ratio of the target scan line number to the scannable line number similarly to the case of raising the scanning speed, it is possible to display a normal image.

It is preferable that the above described scanning-type image display devices of the first, second, third, and fourth aspects of the invention, further include a beam diameter enlarging section that enlarges a beam diameter of the light when the scanning speed or amplitude by the vertical scanner is increased.

With this constitution, it is possible to obtain a smooth image without pixelization even when the scanning speed or amplitude by the vertical scanner is increased.

Next a scanning-type image display devices of a fifth and a sixth aspects of the invention will be described that is applied to the case of a video signal with a higher resolution than the resolution that is assumed by the horizontal scanner being input.

That is, the above described case, stated in terms of the constituent features of the invention, refers to the case of the number of scan lines that a manufactured horizontal scanner is capable of scanning (scannable line number) being less than the number of lines that the horizontal scanner should scan as determined by the format of a video signal (target scan line number).

In this case, the fifth aspect of the invention provides a scanning-type image display device including: a light source section that is light; a horizontal scanner that scans the light in a horizontal direction and that is capable of scanning at a scan line number defined by a first video signal; a vertical scanner that scans the light in a vertical direction; and a control section that controls in such a manner that, when a second video signal is input that has a scan line number that is greater than the scan line number defined by the first video signal the control section controls so as to perform horizontal scanning by the horizontal scanner and vertical scanning by the vertical scanner spanning from a current frame to a next frame, and at a point of time when the drawing corresponding to a video signal of (n−1) frame segments in "n" frames where "n" is an integer of 2 or more is completed, the control section controls so as not to perform drawing that corresponds to a video signal of 1 frame segment.

Also, in this case, the sixth aspect of the invention provides a scanning-type image display device including: a light source section that emits light; a horizontal scanner that scans the light in a horizontal direction that is capable of scanning at a scannable line number; a vertical scanner that scans the light in a vertical direction; and a control section that controls in such a manner that, when the scannable line number is smaller than a target scan line number at which the horizontal scanner is to scan as determined by a format of a video signal, the control section controls so as to perform horizontal scanning by the horizontal scanner and vertical scanning by the vertical scanner spanning from a current frame to a next frame, and at a point of time when the drawing corresponding to a video signal of (n−1) fame segments in n frames where "n" is an integer of 2 or more is completed, the control section controls so as not to perform drawing that corresponds to a video signal of 1 frame segment.

The phrase "scannable line number" equivalently means "scan line number defined by first video signal" of the above described scanning-type image display devices of the invention. The phrase "target scan line number" equivalently means "second video signal has a scan line number that is less than the scan line number defined by the first video signal" of the above described scanning-type image display devices of the invention.

In the scanning-type image display device of the above described constitution, although the horizontal scanner must be able to scan greater than the target scan line number, since the scannable line number is less than the target scan line number, it is not possible to draw all the pixel data in 1 frame period.

Therefore, drawing is performed exceeding 1 frame period by spanning from the current frame to the next frame.

At this time, since the video signal of the next frame is input during the screen drawing, the data is actually stored in a data storage memory such as a frame buffer, and after scanning the target scan line number, the data is read out from the memory and the next frame is displayed.

Thus, it is possible to draw all the pixel data.

However, since the memory capacity is finite, at some point the data will no longer be storable.

Here, at the point of time at which the drawing corresponding to the video signal of (n−1) frame segments in n frames (where "n" is an integer of 2 or more) is completed, for example, assuming the drawing correspond to a video signal of 2 frame segments in 3 frames is completed, the drawing corresponding to the video signal of 1 frame segment is not performed and that data is deleted.

Although by doing so frames that are not drawn will occur at the proportion of one frame in a number of frames, within a single frame there is no omission of pixel information, thus enabling high-definition image display.

The scanning-type image display device of the invention can thus display an image with a high display quality without performing resolution conversion even in the event of a video signal with a high resolution.

Note that in this constitution, although the image is not limited to being a still image or moving image, due to thinning of the image information every frame, it is suited to the display of still images.

It is preferable that, in the above described scanning-type image display devices of the first second, third, fourth, fifth, and sixth aspects of the invention, the horizontal scanner be a resonating-type MEMS scanner.

Since a resonating-type MEMS scanner has the characteristics of small size, high speed, high accuracy, and quietness, it is possible to realize a scanning-type image display device that is compact, quiet, and has a high display quality according to the present constitution.

DESCRIPTION OF EXEMPLARY EMBODIMENT

First Embodiment

Hereinafter, a first embodiment of the invention will be described with reference to FIGS. 1 to 3.

In the first embodiment, a description is given using as an example a laser scanning-type image display device that displays an image on a screen by scanning laser light (scanning-type image display device).

Figure 1:
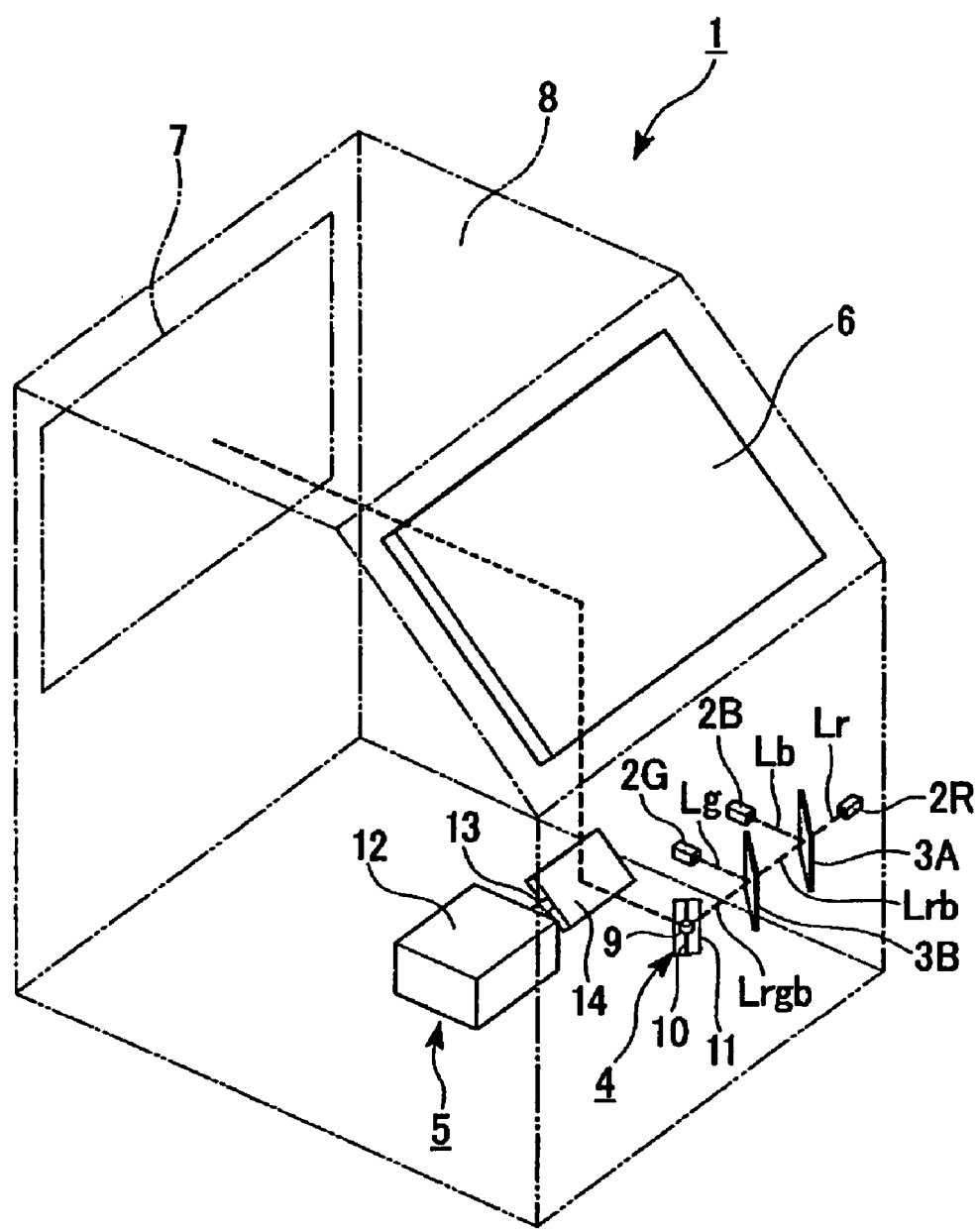
FIG. 1 is a perspective view showing the main sections of the image display device of the first embodiment of the invention.
Figure 2:
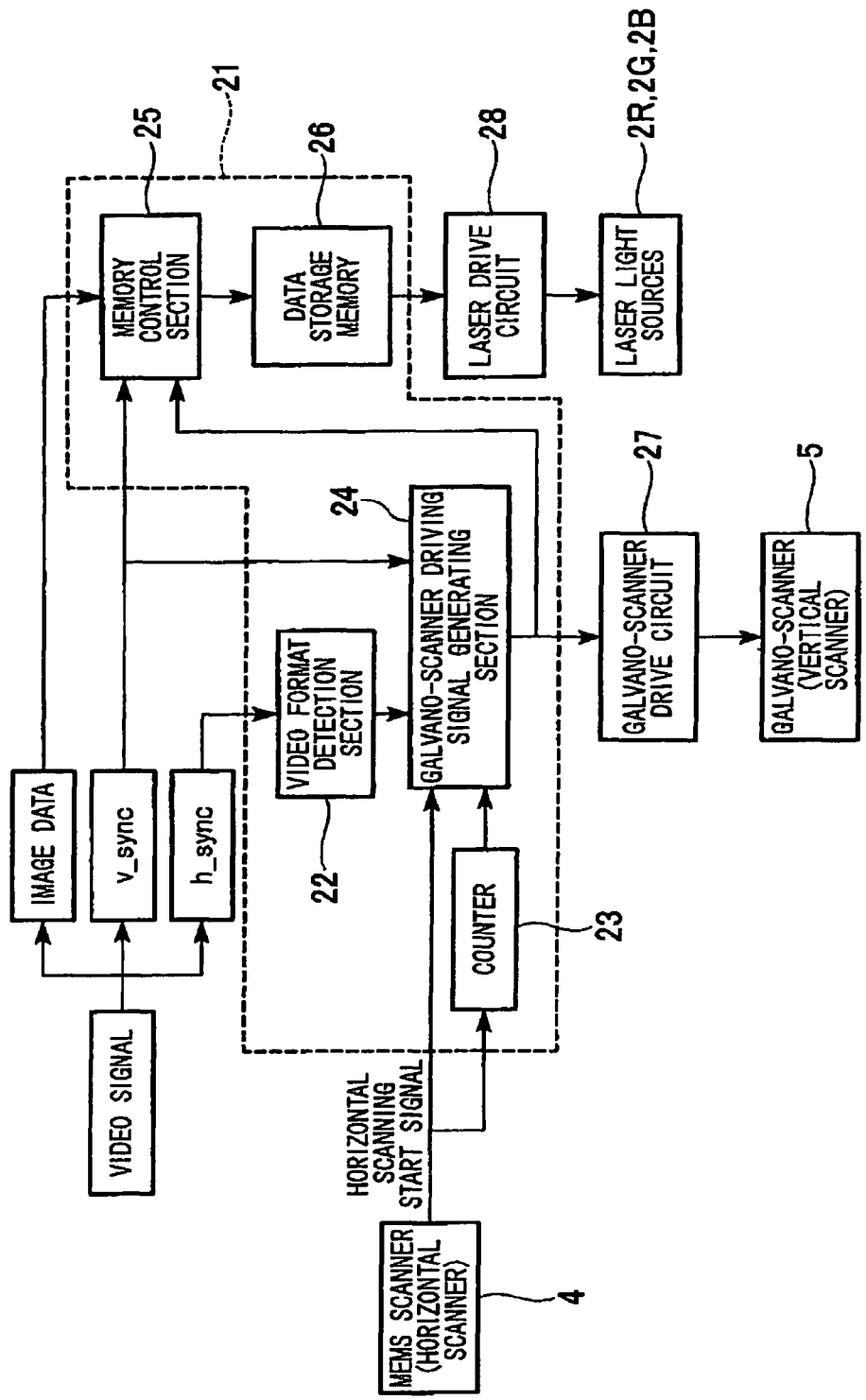
FIG. 2 is a functional block diagram of the control section of the image display device of the first embodiment of the invention.

FIG. 1 is a perspective view of the main sections of the laser scanning-type image display device of the first embodiment FIG. 2 is a functional block diagram of the control section of the same device. FIG. 3 is a conceptual diagram of the method of vertical scanning in the laser scanning-type image display device.

A laser scanning-type image display device 1 (hereinafter simply referred to as an image display device) of the first embodiment includes laser light source sections 2R, 2G, and 2B (light source section), dichroic mirrors 3A and 3B, a MEMS scanner (horizontal scanner) 4, a galvano-scanner (vertical scanner) 5, a projection direction changing mirror 6, a screen 7, and a case 8.

The laser light source sections 2R, 2G, and 2B respectively emit laser light of the colors red (R), green (G), and blue (B).

The laser scanning-type image display device 1 is referred to as a rear-projection type image display device. In the laser scanning-type image display device 1, the laser light source sections 2R, 2G, and 2B and the above described optical systems are housed in the case 8, images have projected from the back surface side of the transparent screen 7 are viewed from the front surface of the screen 7.

Each of the laser light source sections 2R, 2G, and 2B are disposed so that the light path of the blue light Lb that is emitted from the blue laser light source section 2B and the light of the green light Lg that is emitted from the green laser light source section 2G are orthogonal the light path of the red light Lr that is emitted from the red laser light source section 2R.

The dichroic mirror 3A is installed at the position at which the light path of the red light Lr from the red laser light source section 2R and the light path of the blue light Lb from the blue laser light source section 2B intersect. The dichroic mirror 3A reflects the blue light Lb and transmits the red light Lr.

The dichroic mirror is installed at the position at which the light path of the light Lrb composed of the red light Lr and the blue light Lb and the light path of the green light Lg from the green laser light source section 2G intersect. The dichroic mirror 3B reflects the green light Lg and transmits the red light Lr and the blue light Lb.

The dichroic mirror 3A is disposed at an angle whereby the blue light Lb is made incident on the reflecting surface of the mirror at an incident angle of 45 degrees. The dichroic mirror 3B is disposed at an angle whereby the green light Lg is made incident on the reflecting surface of the mirror at an incident angle of 45 degrees.

The lights from the laser light source sections 2R, 2G, and 2B are synthesized by the dichroic mirrors 3A and 3B to become light that forms a full color image.

The MEMS scanner 4 scans the light Lrgb following its synthesis by the dichroic mirrors 3A and 3B in the horizontal direction of the screen 7 and is disposed m the light path of the light Lrgb after its synthesis.

In the first embodiment, the MEMS scanner 4 draws an image in reciprocating motion during scanning of light from the left to the right of the screen 7 and during scanning of light from the right to the left of the screen 7.

The MEMS scanner 4 integrates a movable mirror 9, a torsion bar 10, and a support frame 11 using, for example, single-crystal silicon micromachining technology.

The movable mirror 9 reciprocally rotates in a predetermined range centered on the torsion bar by, for example, the twisting force due to electrostatic and restoring force of the torsion bar 10.

By this force, the MEMS scanner 4 can scan light with a predetermined deflection angle in the circumferential direction of the rotational movement.

Also, by operating the MEMS scanner 4 at its resonance point, it is possible to perform scanning at a large deflection angle and high speed.

The galvano-scanner 5 is disposed in the light path of the light that is emitted from the MEMS scanner 4. The galvano-scanner 5 scans the light Lrgb following its synthesis by the dichroic mirrors 3A and 3B in the vertical direction of the screen 7.

The galvano-scanner 5 of the first embodiment draws an image in one direction of scanning from the top to the bottom of the screen 7.

The galvano-scanner 5 includes a mirror 14 that is rotatable at a centered drive axis 13 of a motor 12.

By the rotating operation of the mirror 14, the galvano-scanner 5 can scan light with a predetermined deflection angle in the circumferential direction of the rotational movement.

As shown in FIG. 2, a control section 21 (vertical scanner control section) of the image display device 1 of the first embodiment includes a video format detection section 22, a counter 23, a galvano-scanner driving signal generating section 24, a memory control section 25, and a data storage memory 26, and so on.

The video signal includes pixel data including color information, brightness information, or the like of each pixel, a vertical synchronizing signal (hereinafter denoted as v_sync), and a horizontal synchronizing signal (hereinafter denoted as h_sync).

The video format detection section 22, upon receiving the horizontal synchronizing signal h_sync in the video signal, detects the format (resolution) of the video signal that is currently being input.

Also, the counter 23, upon receiving a series of horizontal scanning start signals from the MEMS scanner 4, counts the number of scan lines that the MEMS scanner 4 has scanned (corresponding to the pulse number of the horizontal scanning start signals in one frame).

The galvano-scanner driving signal generating section 24, upon receiving the image format detection result by the video format detection section 22, the vertical synchronizing signal v_sync, the horizontal scanning start signal, and the scan line number data in a frame from the counter 23, generates a vertical scanning start signals, an initial position flyback signal, a scanning stop signal, and a scanning speed signal, and so on.

The data storage memory 26 is a frame buffer memory that is capable of storing at least one frame segment of pixel data.

The memory control section 25, upon receiving the pixel data and vertical synchronizing signal v_sync or signal from the galvano-scanner driving signal generating section 24, determines the data amount to be stored in the data storage memory 26 and the frame information to be omitted, and also generates a write timing signal and a readout timing signal, and so on.

A galvano-scanner drive circuit 27 receives the vertical scanning start signal, the initial position flyback signal, the scanning stop signal, and the scanning speed signal from the galvano-scanner driving signal generating section 24, and so on, generates a signal for actually driving the galvano-scanner 5, and drives the galvano-scanner 5.

A laser drive circuit 28 receives the pixel data that is read from the data storage memory 26, generates a signal for actually driving the laser light source sections 2R, 2G, and 2B and drives the laser light source sections 2R, 2G, and 2B.

Here, an example of scanner control in the image display device 1 of the first embodiment will be described with reference to FIG. 3.

Figure 3:
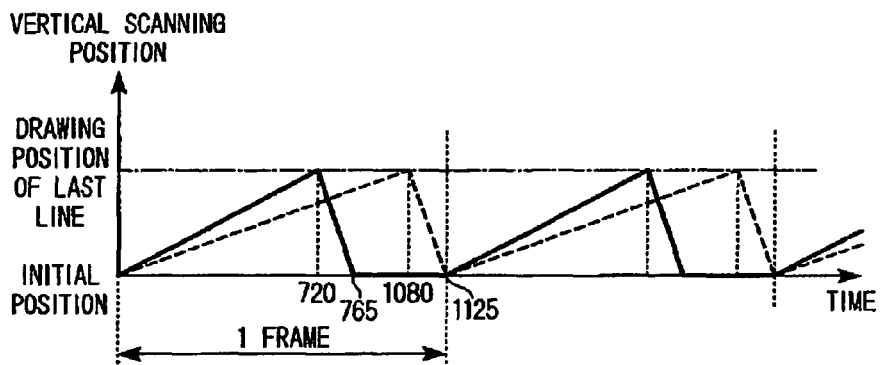
FIG. 3 is a conceptual diagram of the method of vertical scanning in the image display device of the first embodiment of the invention.

In FIG. 3, the dashed line represents a vertical scan image at a time at which a 1080p video format (the designed fort) is input, and the solid line represents a vertical scan image at a time at which a 720p video format (format of the first embodiment) is input.

The same is true in the following conceptual diagrams.

As stated above, the scanning format of the first embodiment consists of back-and-forth screen drawing by the resonant-type MEMS scanner 4 on the horizontal scanning side and one-way screen drawing by the galvano-scanner 5 on the vertical scanning side.

Here assumes the manufacture of a scan system that corresponds to the video format of 1080p (resolution: 1920× 1080 {2200×1125}, 60 Hz) for widescreen and hi-definition video.

The resolution in brackets represents the value incorporating the flyback time of the light beam.

When designing the MEMS scanner 4 so as to be able to correspond to a video signal having this video format (a first video signal), a MEMS scanner 4 is adopted that resonates at a frequency of scanning 1125 lines (the scannable line number) in 1/60 second (1 frame period).

A video signal having a video format differing from that which is assumed, for example, a 720p video for (resolution: 1280×720 {1650×750}, 60 Hz) (a second video signal) is input to the above described system.

In this case, when displaying the 720p video format, it is sufficient for the MEMS scanner 4 to scan only 750 lines (target line number).

However, since there is no point in not driving the MEMS scanner 4 at its resonance point, it is in the end driven as designed, and so although the video format is 720p, it scans 1125 lines.

As a result, the drawing of one frame of the video signal is actually completed in a shorter time than one frame period, or ⅔ of one frame period (=750/1125, the ratio of the target scan line number to the scannable line number).

At this time, since the galvano-scanner 5 scans at a vertical scanning speed that corresponds to the assumed video format, the image is displayed in a manner contracted ⅔ in size in the vertical direction.

Therefore, if vertical scanning is performed with the vertical scanning speed by the galvano-scanner 5 raised 3/2 times (the reciprocal of ⅔) without changing the 60 Hz frequency of the vertical scanning performed by the galvano-scanner 5, the image which is contracted ⅔ in the vertical direction is displayed stretched 3/2 times, and so can be returned to its normal display state.

Note that while the vertical scanning speed was raised here without changing the frequency of the vertical scanning of the galvano-scanner 5 at 60 Hz, the frequency of the vertical scanning of the galvano-scanner 5 may be somewhat changed.

However, once the horizontal scanning (drawing) of 720 lines is completed in conformance with the 720p video format, if the vertical scanner at this point returns to the initial position and immediately restarts vertical scanning, since the time actually required for the drawing of one frame segment of the video signal is ⅔ of one frame period, the vertical scanning does not agree with the image format, leading to image distortion.

Therefore, at the point in time when the horizontal scanning of the 720 lines in the current frame is completed, the return of the drawing position of vertical scanning by the galvano-scanner 5 to the initial position commences, and after returning to the initial position, is temporarily stopped.

At this time, the drawing is also stopped (i.e., the laser light is switched off) until the passage of time corresponding to 1125−720=405 lines (time range) after the completion of the horizontal scanning.

Then, the horizontal scanning and drawing are restarted from the initial position in synchronization with the start timing of the next frame, specifically, in synchronization with the first horizontal scanning start signal following the input of the vertical synchronizing signal of the next frame, and the same processing is repeated on the next frame.

In this way, according to the image display device of the first aspect of the invention, even when a low resolution video format differing from that designed for the resonant-type MEMS scanner 4 is input, it is possible to display an image at an appropriate size in accordance with the size of the screen without performing resolution conversion.

Also, since the horizontal scanning and vertical scanning can be reliably synchronized, it is possible to ensue a favorable display quality without image distortion.

Also, in the first embodiment, since the action of returning the galvano-scanner 5 to its initial position is performed in the first half of the time range, while the second half of the time range is used as time for allowing the galvano-scanner 5 to settle in a stabilized state at the initial position, it is possible to more fully prevent image distortion.

Note that it is more preferable to start the operation of returning the galvano-scanner 5 to its initial position immediately after the start of the time range and use the remainder of the time range as time to allow the galvano-scanner 5 to enter a stabilized state at the initial position.

Second Embodiment

A second embodiment of the invention will be described hereinbelow.

The basic constitution of the laser scan-type image display device of the second embodiment is completely identical to the first embodiment, with only the method of vertical scanning differing from the first embodiment.

Therefore, only this point will be described with reference to FIG. 4.

Figure 4:
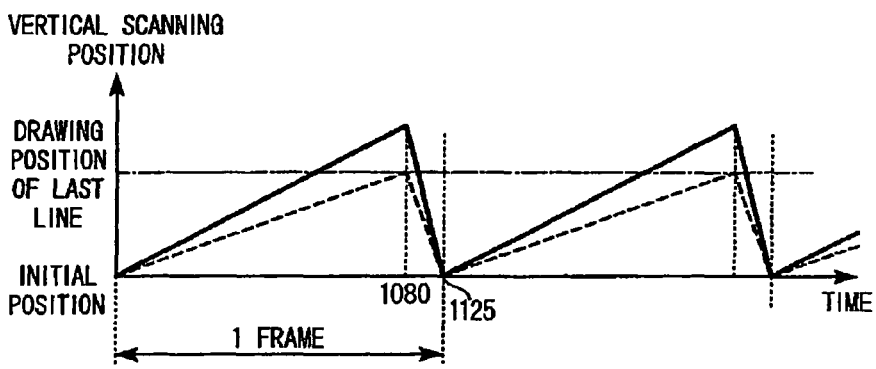
FIG. 4 is a conceptual diagram of the method of vertical scanning in the second embodiment of the invention.

FIG. 4 is a conceptual diagram of the method of vertical scanning in the laser scanning-type image display device of the second embodiment.

In the second embodiment as well, the description is made assuming similarly to the first embodiment that a video signal with a 720p video format is input to a 1080p scan system.

In the image display device 1 of the first embodiment, contraction of the image in the vertical direction was corrected by raising the vertical scanning speed 3/2 times.

In contrast, the image display device of the second embodiment corrects the contraction of the image by increasing the amplitude of vertical scanning as shown in FIG. 4.

That is, since the drawing of one frame of the video signal is completed in just ⅔ of one frame period (=750/1125, the ratio of the target scan line number to the scannable line number), assuming the frequency of vertical scanning of the galvano-scanner 5 remains at 60 Hz, if vertical scanning is performed with the scanning amplitude raised 3/2 times (the reciprocal of ⅔) to the scanning amplitude corresponding to 1080p, the image which is contracted ⅔ in the vertical direction is displayed stretched 3/2 times, and so can be returned to its normal display state.

In other words, in the second embodiment, scanning is performed until a location exceeding the drawing position of the last line of the screen, and the drawing position returns to the initial position similarly to during 1080p using the flyback time for a 45 line segment.

Thus, by increasing the scanning amplitude, the distance over which the drawing position travels in the vertical direction per unit time increases, and in effect becomes equivalent to increasing the speed of the vertical scanning.

Accordingly, the image display device of the second embodiment can obtain the same effect as the image display device of the first embodiment, namely, being capable of displaying an image with a high display quality without performing resolution conversion even in the event of a low-resolution video formats.

Also, since the second embodiment only increases the scanning amplitude without changing the vertical scanning frequency, there is no need to temporarily stop the galvano-scanner 5, unlike the first embodiment.

Accordingly, since it is sufficient to change only the amplitude of the driving signal waveform of the galvano-scanner 5, this embodiment has the advantage of the control of the galvano-scanner 5 being simple.

Third Embodiment

A third embodiment of the invention will be described hereinbelow.

The basic constitution of the last scan-type image display device of the third embodiment is completely identical to the first embodiment, with only the method of vertical scanning differing from the first embodiment.

Therefore, only this point will be described with reference to FIG. 5.

Figure 5:
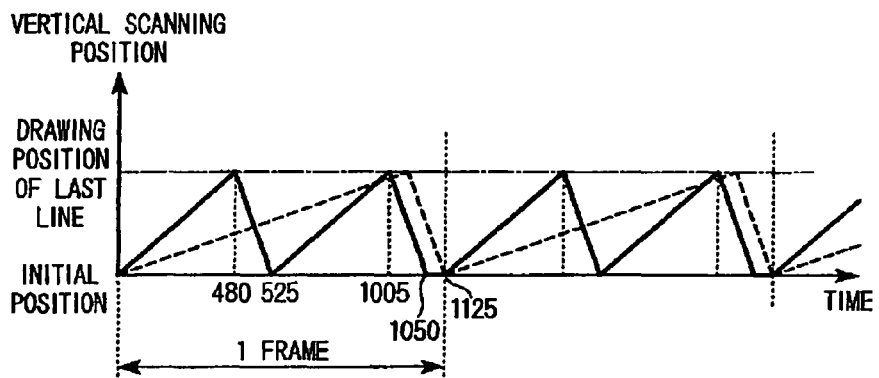
FIG. 5 is a conceptual diagram of the method of vertical scanning in the third embodiment of the invention.

FIG. 5 is a conceptual diagram of the method of vertical scanning in the image display device of the third embodiment.

In the third embodiment, it is assumed that a video signal having a video format with a resolution of 480p (858×525, 60 Hz) (second video signal) that is still lower than the first embodiment is input to a 1080p scan system similarly to the first embodiment.

In the case of displaying this video format, it is sufficient for the MEMS scanner 4 to scan only 525 lines (target line number).

However, the MEMS scanner 4 actually scans 1125 lines.

As a result, the drawing of one frame of the video signal is completed in just ½ the time (=480/1125) or less than one frame period.

Figure 6:
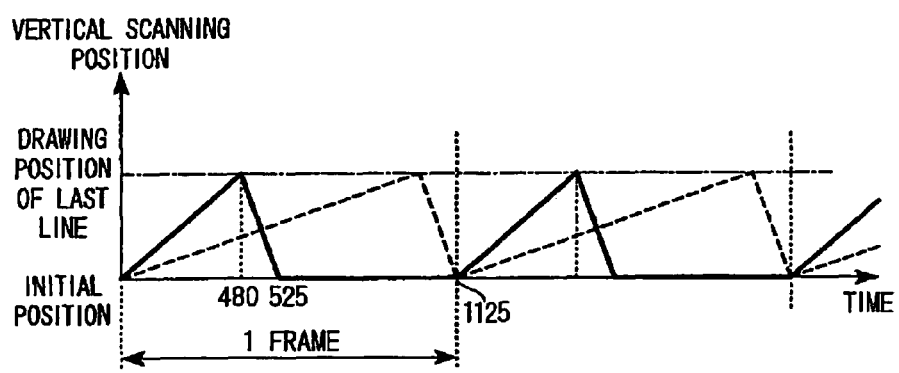
FIG. 6 is a conceptual diagram assuming the same scanning as in the first embodiment is performed in the third embodiment.

At this time, when displaying by the same method as the first embodiment (FIG. 3), as shown in FIG. 6, although the size of the image can be restored to normal, for the time lasting equal to or greater than ½ of one frame period the screen goes completely black.

For this reason, screen flicker is generated, causing the display quality to be lowered.

Here, if the drawing of one frame segment of the video signal is completed in the time of ½ or less of one frame period so that the time equal to or greater than ½ of one frame period remains, it is possible to draw the same frame one more time.

Specifically, in the first embodiment, after one drawing is completed, the vertical scanning and drawing are temporarily stopped for the time until 1125 lines. However, in the third embodiment, as shown in FIG. 5, after the scanning of 480 lines is complete, the drawing position of the vertical scanning immediately starts to return to the initial position and draws the same picture information one more time immediately after ruing to the initial position.

At this time, the pixel data should be drawn out from the same region of the data storage memory 26 by an instruction of the memory control section 25.

Thus, the time needed for drawing the same image information two times, assuming the time for returning 45 lines from the end of the first drawing to the initial position is required, is the time for 480+45+480=1005 lines.

Accordingly, until the current frame ends (i.e., 1/60 of a second elapses) the time for 1125−1005=120 lines remains.

Therefore, by using this time range, the drawing position of the vertical scanning starts to return to the initial position, and after returning to the initial position, the vertical scanning and drawing are temporarily stopped.

Thereafter, after the completion of the horizontal scanning, when the time for 1125−1005=120 lines has elapsed, the vertical scanning and drawing restart from the initial position, and the same processing is repeated on the next frame.

The state of the screen going completely black is thus reduced to a very short time, which can suppress the occurrence of flickering.

In the image display device of the third embodiment it is possible to display an image with a high display quality and with no image distortion without performing resolution conversion even in the event of a video format with a resolution of 480p that is still lower than the first embodiment.

Also, by drawing the same frame twice, it is possible to suppress the flicker that is generated when drawing by the same method as in the first embodiment, and so it becomes possible to raise the display quality.

Note that the third embodiment disclosed an example that starts the second drawing directly after the completion of the first drawing without sparing time once the drawing position has returned to the initial position.

Instead of this method, it is acceptable to distribute a portion of the stoppage time that remains after returning the drawing position to the initial position when the second screen drawing is complete (corresponding to 120 lines) to the period after returning the drawing position to the initial position following the first drawing.

Also, assuming the drawing of one frame segment of the video signal is completed in ⅓ or less time of one frame period, it is possible to perform the drawing three times. In the case of the drawing of one frame segment of the video signal generally needing 1/m or less time (where "m" is an integer of 2 or more), it is possible to perform the drawing m times.

Also, although the third embodiment was constituted to draw the exact same image two times, this constitution may be replaced with one that draws an interpolation image that is generated from the image of the current frame and the image of the next frame when performing the second drawing.

For example, in the image processing section, it is possible to generate an interpolation image by calculating a moving vector from the differential information of the image of the current frame and the image of the next frame and assuming a midpoint of motion from that information.

In that case, although a load of creating the interpolation image is placed on the image processing section, a smooth image can be obtained particularly during moving images.

Fourth Embodiment

A fourth embodiment of the invention will be described hereinbelow.

The basic constitution of the laser scan-type image display device of the fourth embodiment is completely identical to the first embodiment, with only the method of vertical scanning differing from the first embodiment.

Therefore, only this point will be described.

In the fourth embodiment, it is assumed that a video signal having a video format of 4K2K (4096×2160, 24 Hz) for digital cinema (a second video signal) is input to a 1080p scan system similarly to the first embodiment.

Since the refresh rate in the first embodiment is 60 Hz, the MEMS scanner 4 performs horizontal scanning of 1125 lines within the time of 1/60 second (one frame period in the first embodiment).

In contrast, since the refresh rate in the fourth embodiment is 24 Hz, the MEMS scanner 4, similarly to the first embodiment, performs horizontal scanning of 1125/24×60=2812.5 lines (scannable line number) within the time of 1/24 second (one frame period on the fourth embodiment).

In contrast, drawing of 2160 lines (scannable line number) should be performed in one frame period.

Accordingly, other than driving the galvano-scanner 5 that handles vertical scanning also at 24 Hz, by performing driving similarly to the first embodiment a satisfactory display is possible.

Fifth Embodiment

A fifth embodiment of the invention will be described hereinbelow.

The basic constitution of the laser type image display device of the fifth embodiment is completely identical to the first embodiment.

In contrast to the first through fourth embodiments above that were examples of video formats with a lower resolution being input to a 1080p scan system, the fifth embodiment is an example of a video format with a higher resolution being input to a 1080p scan system.

Figure 7:
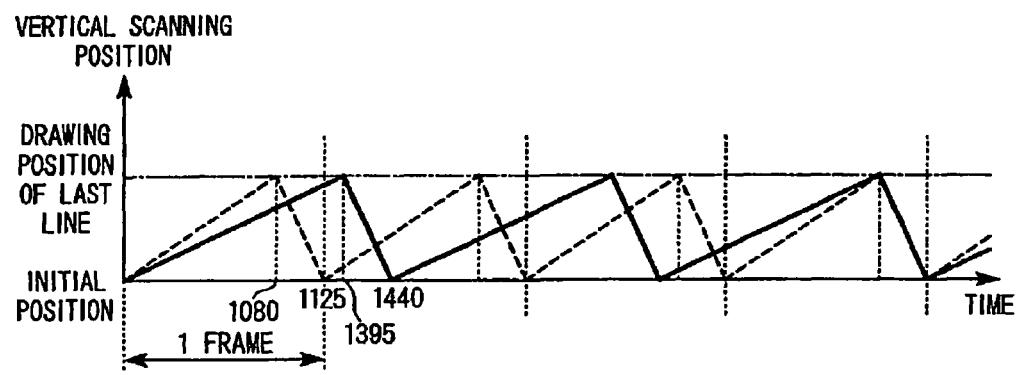
FIG. 7 is a conceptual diagram of the method of vertical scanning in the fifth embodiment of the invention.

FIG. 7 is a conceptual diagram of the method of vertical scanning in the laser scanning-type image display device.

The fifth embodiment assumes that a video signal having a video format with a resolution of 2560×1440, 60 Hz (a second video signal) is input to a 1080p scan system similar to the first embodiment.

In this case, there is a need to scan at least 1440 lines (target scan line number) in 1/60 second (1 frame period), but since a 1080p scan system is used, only 1125 lines (scannable line number) can be scanned.

For this reason, it is not possible to draw all of the pixel data in one frame period.

Therefore, as shown in FIG. 7, horizontal scanning and vertical scanning are performed spanning the length of time for scanning 1440 lines from the current frame to the next frame. The length of time for scanning 1440 lines is longer than the length of time for a picture to be drawn in one frame period (the length of time for scanning 1125 lines).

However, while drawing the pixel data of the current frame over the next frame, the pixel data of the next frame is input Therefore, while storing the pixel data of the next frame in the data storage memory 26 such as a frame buffer after scanning 1440 lines, the data is retrieved from the data storage memory 26 by an instruction from the memory control section 25, and the drawing of the next frame is performed.

Thus, it is possible to perform screen drawing of all the pixel data in one frame without any omission.

However, by repeating this process, the drawing gradually becomes delayed, and since the data storage memory 26 has a finite capacity, at some point data will no longer be storable.

Therefore, in the fifth embodiment, since 1440/1125=1.28, drawing of three frames is performed in the time of four frames.

That is, the data of four frames is input during the drawing of three frames of data.

Accordingly, one frame segment of data is not drawn at the proportion of once in four frames.

That portion of data is deleted from the data storage memory 26.

Although frames that are not drawn will occur at the proportion of one frame every four frames with the above arrangement, within a single frame there is no omission of image data, thus enabling high-definition image display.

The image display device of the fifth embodiment can thus display an image with a high display quality without performing resolution conversion even in the event of a video signal with a higher resolution than designed for.

Note that although the present constitution is not limited to the image being a still image or moving image, due to thinning of the image information every frame, when applied to a moving picture there is the risk of the moving picture quality deteriorating.

That is to say, using the constitution for still pictures is preferred.

The technical scope of the invention is not limited to the foregoing description, and additions, omissions, substitutions, and other modifications can be made without departing from the spirit or scope of the invention.

For example, in the above described embodiments, when enlarging the scanning speed or amplitude by the galvano-scanner, it is possible to adopt a constitution further provided with a beam diameter enlarging section, such as a zoom lens, that enlarges the beam diameter of the light.

With this constitution, it is possible to obtain a smooth image without pixelization even when the scanning speed or amplitude is increased.

Also, in the above described embodiments, examples were given of the scanner for horizontal scanning being a MEMS scanner, and the scanner for vertical scanning being a galvano-scanner. However, the scanners are not limited thereto, and it is possible to use other types of scanners.

However, the scanner for high-speed horizontal scanning is preferably a resonant-type scanner.

Also, examples were given in which the scanner for horizontal scanning performs back-and-forth scanning in which the left end serves as the initial position, and the scanner for vertical scanning performs one-way scanning in which the top end serves as the initial position, but this can also be appropriately modified.

In addition, the foregoing specific disclosures relating to the constitution of the image display device and the video formats etc. are merely examples and appropriate modifications may be made.

Also, as an overall image display device, an example of a rear-projection type image display device was provided, but the invention may be suitably applied to a front projection-type image display device.

Accordingly, the invention is not to be considered as being limited by the foregoing description, and is only limited by the scope of the appended claims.

What is claimed is:

1. A scanning image display device comprising:
a light source section that emits light; a horizontal scanner that scans the light in a horizontal direction and that is capable of scanning at a scan line number defined by a first video signal;
a vertical scanner that scans the light in a vertical direction; and
a vertical scanner control section that controls the vertical scanner in such a manner that, when a second video signal is input that has a scan line number that is less than the scan line number defined by the first video signal, the vertical scanner control section controls the vertical scanner so as to perform vertical scanning with a scanning speed of vertical scanning which is higher than the scanning speed of vertical scanning in the case of the first video signal being input, and temporarily returning a drawing position of vertical scanning to an initial position within a time range from a point of time at which horizontal scanning of a current frame is completed to a start time of a next frame, the vertical scanner control section restarts the vertical scanning from the initial position in synchronization with a start timing of the next frame, wherein the vertical scanner control section performs an operation of returning the drawing position of the vertical scanning by the vertical scanner to the initial position during the first half of the time range, and uses a second half of the time range as time for allowing the vertical scanner to settle in a stabilized state at the initial position.

2. The scanning image display device according to claim 1, wherein the horizontal scanner is a resonating MEMS scanner.

3. A scanning image display device comprising:
a light source section that emits light;
a horizontal scanner that scans the light in a horizontal direction and that is capable of scanning at a scannable line number determined by a format of a first video signal; a vertical scanner that scans the light in a vertical direction; and
a vertical scanner control section that controls the vertical scanner in such a manner that, when the scannable line number determined by the format of the first video signal is greater than a target scan line number at which the horizontal scanner is to scan as determined by a format of a second video signal, and when the second video signal is input, the vertical scanner control section controls the vertical scanner so as to perform vertical scanning with a scanning speed of vertical scanning which is higher than the scanning speed of vertical scanning at a time at which the first video signal is input, and temporarily returning a drawing position of vertical scanning to an initial position with in a time range from a point of time at which horizontal scanning of a current frame is completed to a start time of a next frame, the vertical scanner control section restarts the vertical scanning from the initial position in synchronization with a start timing of the next frame.

4. The scanning image display device according to claim 3, wherein the vertical scanner control section controls the vertical scanner so as to raise the scanning speed by the vertical scanner by a multiple of reciprocal of a ratio of the target scan line number to the scannable line number.

5. The scanning image display device according to claim 3, wherein in a case of a ratio of the target scan line number to the scannable line number being equal to or less than 1/m where "m" is an integer of 2 or more, the vertical scanner control section controls the vertical scanner so as to perform vertical scanning with the scanning speed raised, and temporarily returning the drawing position of the vertical scanning to the initial position, performs an operation of restarting the vertical scanning from the initial position m times in 1 cycle.

6. The scanning image display device according to claim 3, wherein the vertical scanner control section controls the vertical scanner so as to calculate the time range that corresponds to the difference obtained by subtracting the target scan line number from the scannable line number, return the drawing position of the vertical scanning by the vertical scanner to the initial position and stop the vertical scanning during the time range from a point of time at which the horizontal scanning of the current frame is completed, and restart the vertical scanning after the time range from a point of time at which the horizontal scanning is completed has elapsed.

7. The scanning image display device according to claim 3, further comprising a beam diameter enlarging section that enlarges a beam diameter of the light when the scanning speed or amplitude by the vertical scanner is increased.

8. The scanning image display device according to claim 3, wherein the horizontal scanner is a resonating MEMS scanner.

* * * * *